Patented Jan. 27, 1931

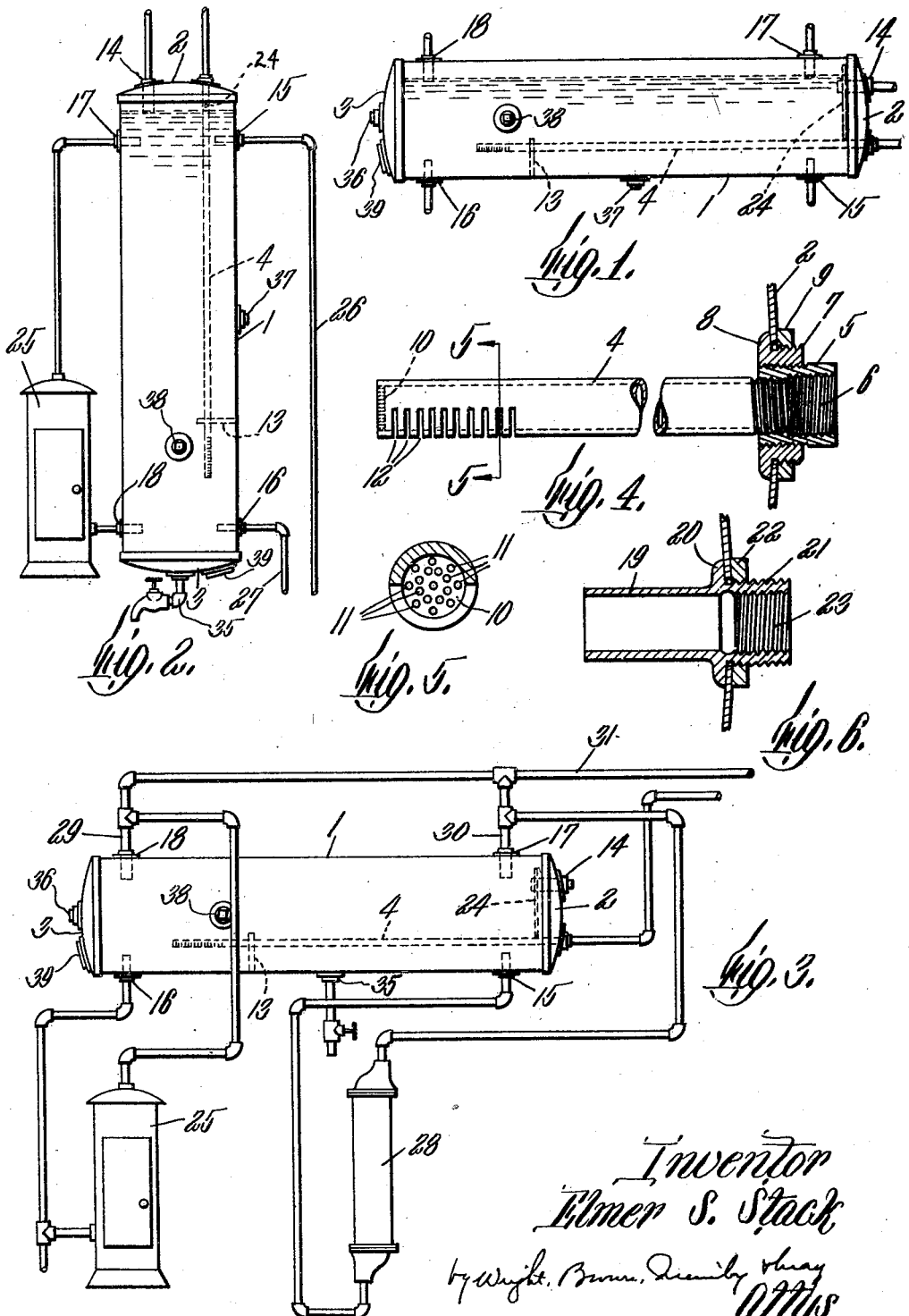

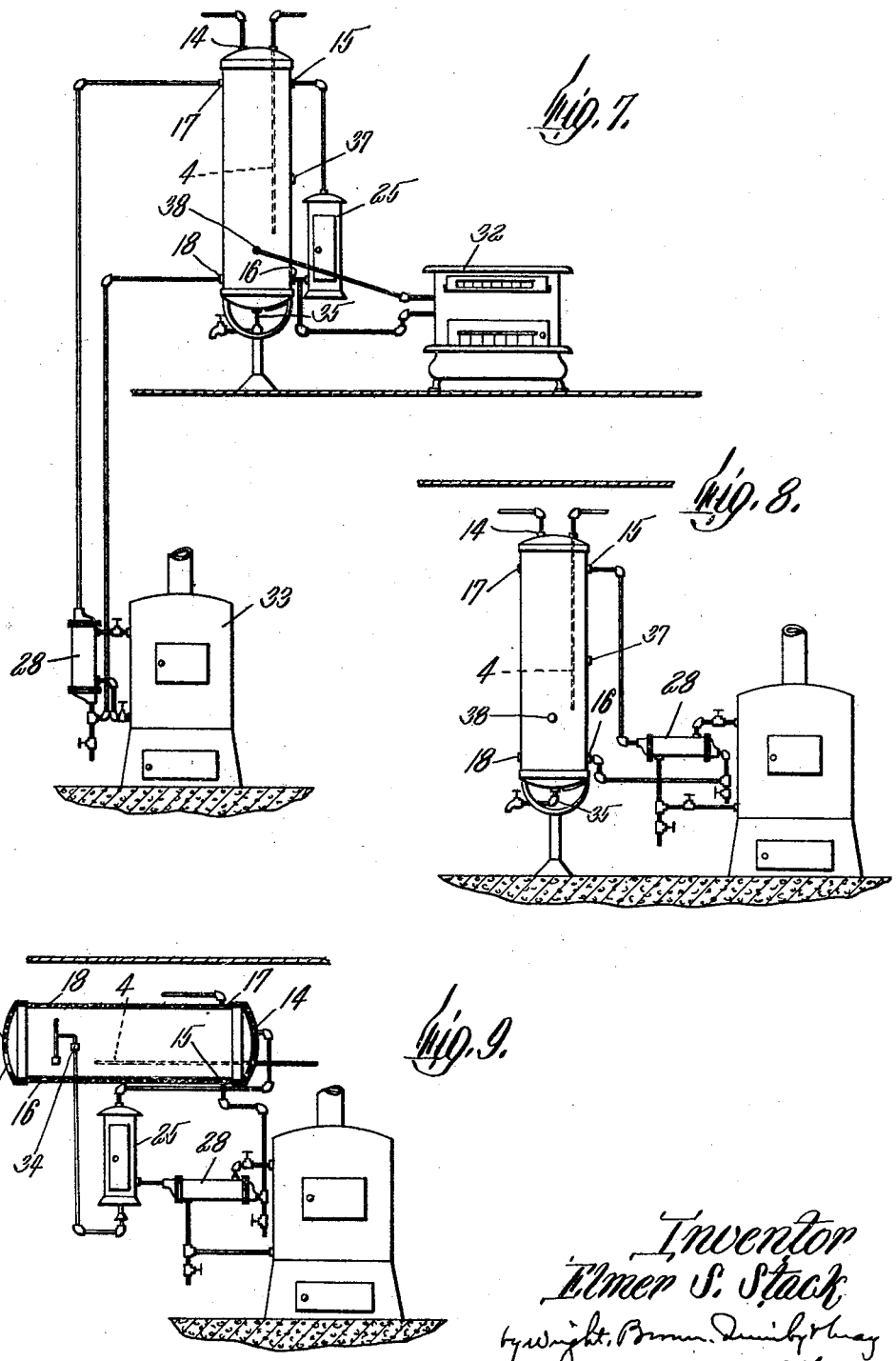

1,790,357

UNITED STATES PATENT OFFICE

ELMER S. STACK, OF SOMERVILLE, MASSACHUSETTS

TANK FOR HOT-WATER SYSTEMS

Application filed June 6, 1927. Serial No. 196,730.

This invention relates to tanks for use in connection with domestic hot water systems to hold and store the water before, during and after heating thereof. By the term "domestic hot water system" I mean systems provided in dwellings and other buildings of human occupancy for heating water to be used for washing and other purposes requiring hot water to be drawn out of the system from time to time. The object of the invention is to provide a standard tank with external fittings for pipe connections adapting the tank to be used in any position or situation in which such tanks are customarily used; that is, either upright or horizontal, and in connection with any kind of water heater or heating means. A further object is to make the cold water inlet for such tank of such a character that it will dissipate the flow and pressure of the incoming water and avoid disturbance thereby of the body of water in the tank.

Inasmuch as my new tank is universally applicable without change or modification in all the positions and situations in which such tanks are applied, I have called it a universal tank.

The nature of the invention and principles and new features which it embodies are explained in the following specification with reference to the drawings.

In the drawings,—

Fig. 1 is an elevation of my new universal tank shown in a horizontal position;

Fig. 2 is likewise an elevation of the same tank shown in a vertical position and in connection with a water heater;

Fig. 3 is an elevation showing the tank again in a horizontal position and coupled with two water heaters;

Fig. 4 is a detail elevation of the inlet pipe of my new tank and the preferred mode of mounting and securing it to the shell of the heater;

Fig. 5 is a cross section of the inlet pipe taken on line 5—5 of Fig. 4 and shown on a larger scale;

Fig. 6 is a sectional view of one of the duplicate fittings with which the tank is provided for connection with pipes to conduct water to and from the tank;

Figs. 7, 8 and 9 are diagrammatic elevations illustrating some of the different positions and environments in which my new tank may be placed and used in connection with heating means of various sorts.

Like reference characters designate the same parts wherever they occur in all the figures.

The tank is made of a cylindrical body shell 1 and heads 2 and 3, which may be fabricated from sheet copper or other suitable material in any of the ways now known and practised with tanks of this character, or otherwise. In the head 2 at one side of the center thereof, and preferably about half way between the center and the side of the tank, is mounted the inlet tube 4. This tube is screw threaded at one end and screwed into a tubular nipple 5, having internal threads at one end to fit the threads of the tube 4 and being internally threaded also at 6 on its opposite end to receive and connect with a pipe or pipe coupling. The nipple is also externally threaded at and adjacent to the end in which the tube is set, this being the inner end, and at the other end is non-circular in the fashion of a bolt head or nut, so that it may be turned by a wrench. It is secured to the tank head by a spud 7 which passes through a hole in the tank head and has a flange 8 on its inner end to lie against the inner side of the tank head, its protruding part being externally threaded and taking a lock nut 9 which is screwed up against the outer side of the tank head to secure the spud. The spud is also internally threaded to mate with the external threads of the nipple 5. The spud may be applied to the tank head before the latter is joined to the body part of the tank, and afterwards the inlet tube may be passed through the spud, and the nipple 5 entered at its threaded end into the spud and screwed home. The pipe for conveying water to the tank is screwed into the outer end of the nipple.

The inlet tube extends parallel with the sides of the tank through the greater part of the distance toward the opposite head 3; approximately to the same relative distance as is the customary practice in tanks of this kind. Its inner end is closed by a plate, cap or plug 10 pierced with numerous holes 11. Adjacent to its inner end, a number of slots 12 are formed in the side toward the nearer side wall of the tank, such slots being conveniently made as saw cuts and extending about half way through the tube. The holes 11 and slots 12 furnish the orifices through which the water conveyed by the tube is discharged into the interior space of the tank. These holes and slots together have a total area somewhat greater than that of the bore of the tube in cross section, while the area of each slot or hole is less than that of the bore. Their purpose and effect is to distribute the water and retard its velocity as it issues from the tube, directing a part of the discharged water toward the end of the tank and the greater part of it toward the nearer side. The distribution of these orifices is wide enough and their area great enough to cause the water to flow out gently and slowly, even though it is conveyed to the tank under high pressure, that is, the full pressure of the water supply with which the domestic water system is connected. Thus whether the tank is placed upright with the head 3 at the bottom or is mounted horizontally with the side nearest to the inlet pipe below, the water issuing from the pipe does not in either case have sufficient force and velocity to cause a stream or eddy in the body of water already in the tank such as would either cause the temperature of the already heated water to be lowered or stir up sediment which may have settled on the tank bottom. The inlet pipes previously used with such tanks admit the cold water in a single stream at high velocity, which causes upward currents of the cold water along the walls of the tank and mixing of the cold with the hot water, lowering the temperature of that in the upper part of the tank. But my present invention avoids such mixing of water at different temperatures by compelling the entering cold water to issue from the pipe so gently that it does not disturb the water above it. The hot water in the upper levels of the tank is raised bodily as the cold water enters, without being mixed with cooler water from lower levels, and is permitted to attain the highest temperature possible to be given by the heating means or agent. This phase of the invention thus enables hot water to be delivered for use at a higher temperature than has been possible heretofore with equipment of this general type. It also makes available for delivery a larger quantity of hot water than from tanks of the same capacity which lack this feature, because all accumulated hot water is delivered without dilution by cold water flowing into the heater during delivery. This is an important advantage of the invention, since it greatly increases the efficiency of the heating system. It insures also that the water delivered will be clear, owing to the fact that sediment which may lie on the tank bottom is not stirred up. Without limiting myself as to the number, dimensions and spacing of the orifices thus described, I may say that in a pipe of 3/4″ external diameter, slots 10 in number, 1/16″ in width, and spaced 1/4″ apart, secure the desired result. I prefer to make the total area of the perforations and slots at least twice as great as the area of the tube, each single perforation and slot of course having an area much less than that of the tube.

A support 13 is mounted in the tank to support the inlet pipe and relieve the head 2 of bending stresses and strains due to the weight of the pipe when the tank is in other than the vertical position. Such support may be made in any desired way, and is preferably a piece of stiff sheet metal curved at one edge to fit the side wall of the tank and provided there with a flange or lugs to be soldered or riveted, or both, to the tank wall; extending thence inward from the wall far enough to cross the location of the pipe and having a hole through which the inner end of the tube may be passed when the parts of the tank are assembled.

Other fittings, for connection with delivery and circulating pipes, are applied to the tank, all approximately or nearly in the same axial plane of the tank with the inlet pipe. One of such fittings is mounted at 14 in the head 2, at the opposite side of the center of such head from the inlet pipe, and preferably at nearly the same distance from the center as the inlet pipe. Two other fittings, 15 and 16, are mounted in the side of the tank nearest to the inlet tube and near the opposite ends of the tank. Two other fittings, 17 and 18, are mounted in the side of the tank most remote from the inlet pipe, also near each opposite end of the tank. A detail of the preferred form of fitting applied at the locations 14 to 18 inclusive, is shown by Fig. 6. This fitting is a tube or nipple 19 passing through the wall of the tank and extending to a substantial distance in the interior thereof. It has a flange 20 to engage the inner surface of the tank wall and its protruding part is externally threaded at 21 to receive a lock or clamp nut 22, and is internally threaded at 23 for connection with one of the pipes of the water system. While the precise extent of the inward extension of the fitting tube 19 is not of the first importance, nevertheless a substantial length is essential in order to provide an air chamber in the tank and avoid liability of stretching or rupturing it by the pressure and surges of the water. I have found that a conveninent length of inward projection is about 2″ with the ordinary domestic tanks used in dwelling houses. It may be longer than this with larger tanks, or slightly shorter. The fittings at 15 and 16 in the side of the tank nearest to the inlet pipe need not extend into the tank appreciably; although use of the same fitting at these points also may be advisable, particularly if the tank is to be used in a horizontal position. In that case, the inward projection of the fittings which are then at the lower side of the tank, prevents sediment from passing into the heater and either being carried by the flowing stream therefrom into the upper levels of the tank, or accumulating in the heater and possibly clogging its water ways.

A vent is provided in the side of the inlet pipe 4 at a distance within the head 2 less than the inward projection of the fitting at 14. Preferably a small tube 24 is connected to the pipe at the vent and extends toward the most remote side of the tank to a point less distant from such side than the inward projection of the fittings at 17 and 18, being open at its remote end and serving as a vent also.

The tank may be mounted in either a horizontal position or in a vertical position, as shown in these drawings. When in the vertical position, the head 2 is located uppermost, and when in the horizontal position, the inlet pipe 4 and the connections 15 and 16 are at the low side of the tank, and the fittings 17 and 18 at the top side. In the one position, the inward extension of the fitting 14, and in the other position, the inward projections of the fittings at 17 and 18 prevent the complete filling of the tank with water, by being sealed when the water reaches the level of their inner orifices and causing the air then remaining in the top part of the tank to be entrapped. The air thus entrapped forms a cushion to absorb the shocks of water hammer or surges and safeguard the tank from the effects thereof.

The vent in the inlet pipe 4 opens by way of the tube 24 into the air chamber when the tank is placed in any of its contemplated positions, although when placed upright this tube may be omitted. Its purpose and function is to prevent siphonic discharge of water from the tank through the pipe 4 and its connections and consequent emptying or collapse of the tank. Such siphonic action may occur in case a cold water tap at a level lower than the tank is opened when other taps are closed and the valve controlling the inlet of water to the building from the street main is also closed. Under such conditions, in the absence of the air chamber and vent of this invention, the siphonic action would create a partial vacuum in the tank equal to the difference in head between the tank and the open tap. This vacuum has the tendency to collapse the tank. But with the present invention, the presence of compressed air in the air chamber of the tank, and the vent opening into such chamber, instantly breaks the vacuum in the pipe line in the conditions mentioned and prevents siphonic action. When the tank is used in the horizontal position, draining through the cold water pipe, and consequent danger of collapse of the tank, is avoided by leading the cold water supply pipe to the inlet pipe in a path which carries it wholly or partly above the upper part of the tank, which is common practice in installations of the ordinary type of tank, as illustrated in Fig. 3. In other words, the supply pipe is formed with a seal or loop such that it cannot drain the tank except by siphonic action, which is prevented by the venting means hereinabove described.

Avoidance of danger of heating appliance explosions is accomplished also as a secondary result of the provisions just described for preventing draining of the tank. Such danger of explosion arises in ordinary types of tank when the heating agent is a coal fire and the tank is drained by siphonic action and then refilled without proper attention having been paid to the fire. The water back of the range, or water heating space or coil of other types of coal heater, will become red hot in such circumstances. The water, thereafter admitted into the tank and coming into contact with the hot surfaces of the water back or coil is suddenly converted into steam, giving rise to great hazard of explosion. Disastrous explosions have been caused in this way when the water supply has been shut off or discontinued due to a break in the street main or supply pipe or to fire engines pumping water out of the system. These possibilities are wholly avoided by the present feature of the invention. Dangerous explosions from other causes may be avoided by the use of relief valves, thermostats in connection with gas, oil or electric heaters, and other known safety devices.

Figs. 2, 3, 7, 8 and 9 show by way of illustration some of the positions and situations in which my improved tank may be mounted. In Fig. 2 it is vertical and connected to circulating pipes leading to a gas water heater 25 at one side, and pipes 26 and 27 at the other side, leading to another heater, such as one of those illustrated in Fig. 7.

Fig. 3 shows the tank mounted horizontally and connected in parallel with two heaters, for instance a gas heater 25 and an indirect water heater 28, one of the heaters being in circulating connection with the tank through the fittings at 16 and 18, and the other through the fittings 15 and 17; the hot water delivery pipe in each heater leading to a pipe (29 or 30 respectively, both of which are connected to a common conducting pipe 31.)

Fig. 7 shows how the same tank may be connected at the same time to three water heaters, to wit, a gas heater 25, the water back of a kitchen range 32, and a heater 33 in the basement of the building, the latter delivering heat through an indirect water heater 28, or otherwise. Any one of these heaters may be coupled singly to the tank, as shown in Fig. 8 with respect to the indirect water heater 28, in which case the fittings other than those coupled to the circulating connection for this heater are closed by plugs or any other common or suitable closures. The pipes for conducting water to be heated from the tank to the different heating units of this combination may be joined together and all connected at a single point in the side of the tank, or they may be connected at separate points. In this illustration the cold water connection to the heater 28 is coupled to the fitting 18, and those to both the gas heater 25 and the range are joined together and coupled to the fitting 16. The fact that these fittings are above the lower end of the tank insures that sediment will not flow into any of the heaters. In Fig. 9 the application of the invention to an automatic storage system is illustrated. Here the tank, preferably enclosed in a heat insulating covering, is coupled in tandem with an indirect water heater 28 and a gas heater 25, in such fashion that the cold water first receives as much heat from the indirect heater as the latter can supply, and is then raised to the prescribed temperature, if further heating is necessary, by the gas heater 25. The latter is preferably controlled by a thermostat 34 operating a valve in the gas supply pipe to a burner in the heater. It will be understood of course that other controllable heating agents than gas, such as oil, electric current, steam, etc. may be used in specifically different heating instruments than the gas water heater 25, the latter being illustratively typical of any such heater. In this case the fitting 15 serves for connection with the outgoing circulating pipe, the fitting at 14 for connection with the pipe conveying heated water back to the tank, and the fitting at 17 for connection with the hot water delivery pipe, the fittings at 16 and 18 being plugged up.

In all these installations, the inlet pipe 4 is mounted in the manner hereinbefore described. When the tank is placed horizontally, this inlet must be at the lower side. Thus, in all modes of mounting and use, the discharge orifices of the inlet pipe are in the lower part of the tank and discharge toward the nearest walls, or nearest parts of the walls; and the discharge is soft and gentle, without any disturbing effect on the body of water in the tank.

Numerous other modes of connection may be put into effect with the tank either in horizontal or vertical position, using the fittings hereinbefore described for connection with the several circulating pipes and the hot water delivery pipe. The fittings which I have described particularly in the foregoing specification, as embodying characteristics novel with this invention, are or may be additional to those with which tanks of the character and for the purpose set forth are customarily provided. Thus in Figs. 2, 3 and 7, 35 represents a draw off connection which is located at the bottom end when the tank is vertical and at the middle of the low side when it is horizontal. The hole or tapping for the draw off connection in the end head is closed by a plug 36 when the tank is mounted horizontally, and that in the side is closed by a plug 37 when the tank is mounted vertically. I have also shown a tapping or fitting, herein represented as plugged, for a thermostat, at 38, in Figs. 1, 2, 3 and 8. This fitting is utilized in Fig. 7 for connection of the hot water pipe from the water back of the range, while Fig. 9 shows it as used for mounting the thermostat 34. Large tanks may also be provided with a hand hole, as shown at 39 in Fig. 3, to give access for cleaning.

The tank having the new features of this invention, together with the old types of connection, is indeed a universal tank adapted for installation in all circumstances where such a tank may be applied, and effective in all such circumstances to cushion the force of water hammer and surging, to avoid collapse under atmospheric pressure due to syphonic discharge of the tank contents, to avoid dilution and chilling of the hot water therein, or disturbance of sediment, by the inflowing cold water, or danger of explosions. It enables the maximum volume of hot water to be furnished from a given size of tank, it avoids clogging of heating appliances, and in a case where a number of heating units are coupled to the same tank, it permits each heater to act independently of the others, and avoids the interferences which is a common liability in the case of cross connections of flow pipes intended to deliver the heated water from two or more heating appliances to a tank through the same tapping.

What I claim and desire to secure by Letters Patent is:

1. A horizontal tank of the character described having end and side walls, a cold water inlet pipe mounted in one of said end walls and extending horizontally the greater part of the distance toward the opposite end wall below the longitudinal middle of the tank, said pipe having a number of orifices in its inner end and in its side adjacent to such end and directed toward the nearer side wall of the tank only, such orifices being collectively larger in area and individually smaller in area than the bore of the pipe.

2. A universal tank of the character described having outlet fittings in its end and side walls projecting into the interior of the tank and adapted to entrap air in the top of the tank when filled with liquid, whether the tank is mounted in horizontal or vertical position, and an inlet pipe extending into the part of the tank which is lowermost, whether the tank is horizontal or vertical, and there having a plurality of discharge outlets directed exclusively toward the nearer walls of the tank and being severally of smaller area and collectively of larger area than the bore of the pipe.

3. A universal tank of the character described adapted for use in either horizontal or vertical position having outlet fittings in its end and side walls projecting into the interior of the tank and adapted to entrap air in the top of the tank when filled with liquid, whether the tank is mounted in horizontal or vertical position, and an inlet pipe extending into the part of the tank which is lowermost, whether the tank is horizontal or vertical, and there having a plurality of discharge outlets directed exclusively toward the nearer walls of the tank and being severally of smaller area and collectively of larger area than the bore of the pipe, said inlet pipe having a vent connection with the space which contains entrapped air whether the tank is vertical or horizontal.

In testimony whereof I have affixed my signatures.

ELMER S. STACK.